United States Patent [19]
Crasnianski

[11] 3,956,968
[45] May 18, 1976

[54] MACHINE FOR AUTOMATICALLY DUPLICATING FLAT KEYS

[75] Inventor: Serge Paul Crasnianski, Grenoble, France

[73] Assignee: Crasnlanski France S.A., France

[22] Filed: Aug. 17, 1973

[21] Appl. No.: 389,214

[30] Foreign Application Priority Data
Sept. 13, 1972 France .............................. 72.33197

[52] U.S. Cl. ............................................. 90/13.05
[51] Int. Cl.² .......................................... B23C 1/16
[58] Field of Search ................................ 90/13.05

[56] References Cited
UNITED STATES PATENTS
| | | | |
|---|---|---|---|
| 3,053,149 | 9/1962 | Rossetti | 90/13.05 |
| 3,625,111 | 12/1971 | Carlo et al. | 90/13.05 |

FOREIGN PATENTS OR APPLICATIONS
| | | | |
|---|---|---|---|
| 1,414,033 | 9/1965 | France | 90/13.05 |

Primary Examiner—Frank T. Yost
Assistant Examiner—Z. R. Bilinsky
Attorney, Agent, or Firm—Robert E. Burns; Emmanuel J. Lobato; Bruce L. Adams

[57] ABSTRACT

The invention relates to a machine for automatically duplicating flat keys, using a model key which is presented to a feeler and a rotating cutter that engages a key blank in accordance with the teeth profile of the model key. The machine comprises a housing with a fixed frame, a movable support carrying the key-clamping jaws, and two motor-operated control cams which impart to said support two orthogonal, reciprocating movements by which the key blank is urged against the cutter and passed along the same with different speeds for the approach movement and for the milling operation.

6 Claims, 9 Drawing Figures

MACHINE FOR AUTOMATICALLY DUPLICATING FLAT KEYS

It is an object of this invention to design a machine for automatically duplicating flat keys, more particularly, keys for door locks, etc.

Machines designed for this purpose are already known. In these machines, a model key and a key blank to be milled to the form of the model key are arranged together in such a way that the key blank performs in relation to a cutter, for the purpose of being machined by this cutter, movements identical to those that the model key performs in relation to a feeler, the form thus traced corresponding to the cut made by the cutter.

These machines most often comprise a movable support hinged to a frame and having two sets of jaws in which the model key and the key blank are clamped parallel to each other in such a way that they are presented respectively to a feeler and to a cutter mounted on a spindle the axis of which is situated in the median longitudinal plane of key blank. This movable support can perform, under the control of two cams which are rotated as a whole by a motor-reducer, two coordinated reciprocating motions, one at least approximately in the direction parallel to the axis of the cutter spindle with a rapid travel of the support towards the departure position where the model key and the key blank are respectively under the feeler and under the cutter and with a slow travel in the opposite direction during the milling, and the other motion in the direction perpendicular to the axis of the cutter spindle in order to hold the model key against the feeler and the key blank against the cutter during the milling operation as well as to disengage the support during its rapid travel towards the departure position. These known machines have, among other disadvantages the disadvantage of using relatively complex mechanisms which result in a high cost of production, of assembling, and of maintenance. In addition thereto, the quality of the milling is often defective because of a too rapid advance of the key blank relative to the cutter. Finally, it sometimes happens that the adjustment of the position of the cutter in relation to the feeler, or vice versa, is imprecise and difficult to accomplish by the operator of the machine.

As an example of this kind of machine, may be cited the one which is disclosed in the Swiss Pat. No. 350528. In this machine, the movable support is hinged at its rear end to the frame by means of an elastic blade while its forepart rests, by means of rollers, on a slide-bar extending substantially parallel to the axis of the cutter drive motor; in this way the support can perform, under the control of a first cam, reciprocating movement in a direction parallel to that of the axis of the cutter, the control cam being designed to permit a more rapid travel towards the departure position than in the opposite direction, corresponding to the milling operation. A second cam rotated integrally with the former causes, by means of a retractable stand, the lowering at the adequate time of the slide-bar of the movable support thereby permitting this support to effect, perpendicularly to the axis of the cutter, a limited angular movement which results in the bringing of the model key into contact with the feeler and the key blank into contact with the cutter. To each of these directions of movement is associated a respective return spring, or group of return springs, tending to oppose the movements controlled by the respective cams. Due to the number of the mechanisms needed for controlling the movements, for guiding the movable support, for performing the return stroke, etc., the known system is relatively complex and consequently, costly. Besides that, one can object to the relatively small axial swing movement which allows only an uneasy accessibility to the jaws and does not assist the positioning and the removal of the keys.

The present invention aims at remedying the above disadvantages of the known machines and, more precisely, at designing an automatic machine for duplicating flat keys which affords simplicity and strength of construction as well as a better accessibility to the key-holding jaws for the positioning and removal operations.

In accordance with one characteristic of the invention, this aim is reached through the fact that the movable support of the machine is hinged to the frame by a link mechanism with two degrees of freedom, permitting it, first to pivot about a horizontal axis perpendicular to that of the cutter, and second, to slide in a vertical direction, and that the slow travel of the first motion corresponding to the milling operation as well as the rapid travel of the second motion corresponding to the disengaging of the support in relation to the cutter are positively driven by the two cams acting against a single spring return means arranged obliquely and interposed between the frame and the movable support which tends to bring the latter back to its departure position.

In accordance with another characteristic of the invention, the movable support, the upper end of which carries the jaws for the model key and the key blank, is hinged at its lower end to the end of a link hinged on a fixed pin integral with the frame, which the other end is connected by a rod to the end of a crank which rotates about a fixed pin also integral with the frame, and which carries on its other end a follower roller engaged with one of the cams. The connection between said link and said one crank is performed in such a way as to permit the movable support to move freely in an upward direction during the milling of the key blank under the action of the spring return means and to be positively moved in a downward direction by said one cam, while the oscillating motion of the movable support is performed by a connecting-rod, hinged at one end half-way up the support, and carrying on its other end a follower roller engaged with the other cam, said connecting-rod being also provided at this latter end with a fork engaged on the shaft carrying the cams.

Other characteristics of the invention will appear from the following description of a preferred embodiment illustrated in the drawings, wherein.

Figure 1:
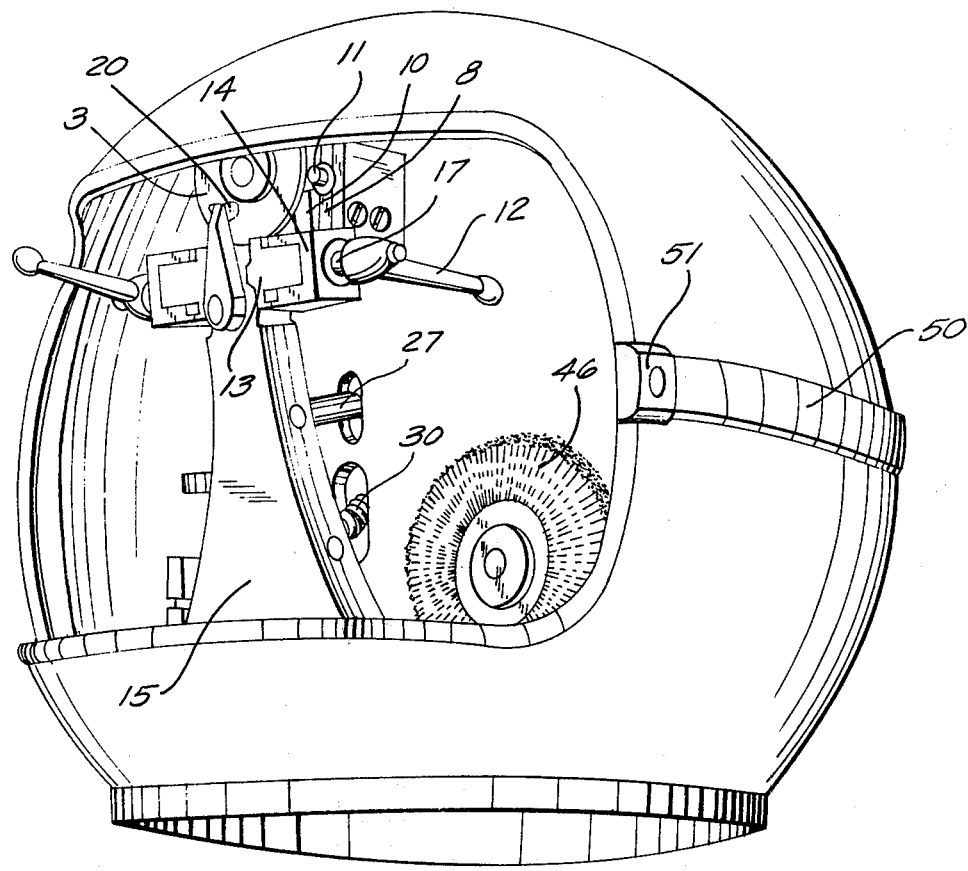
FIG. 1 is a perspective front view of the machine according to the invention.
Figure 2:
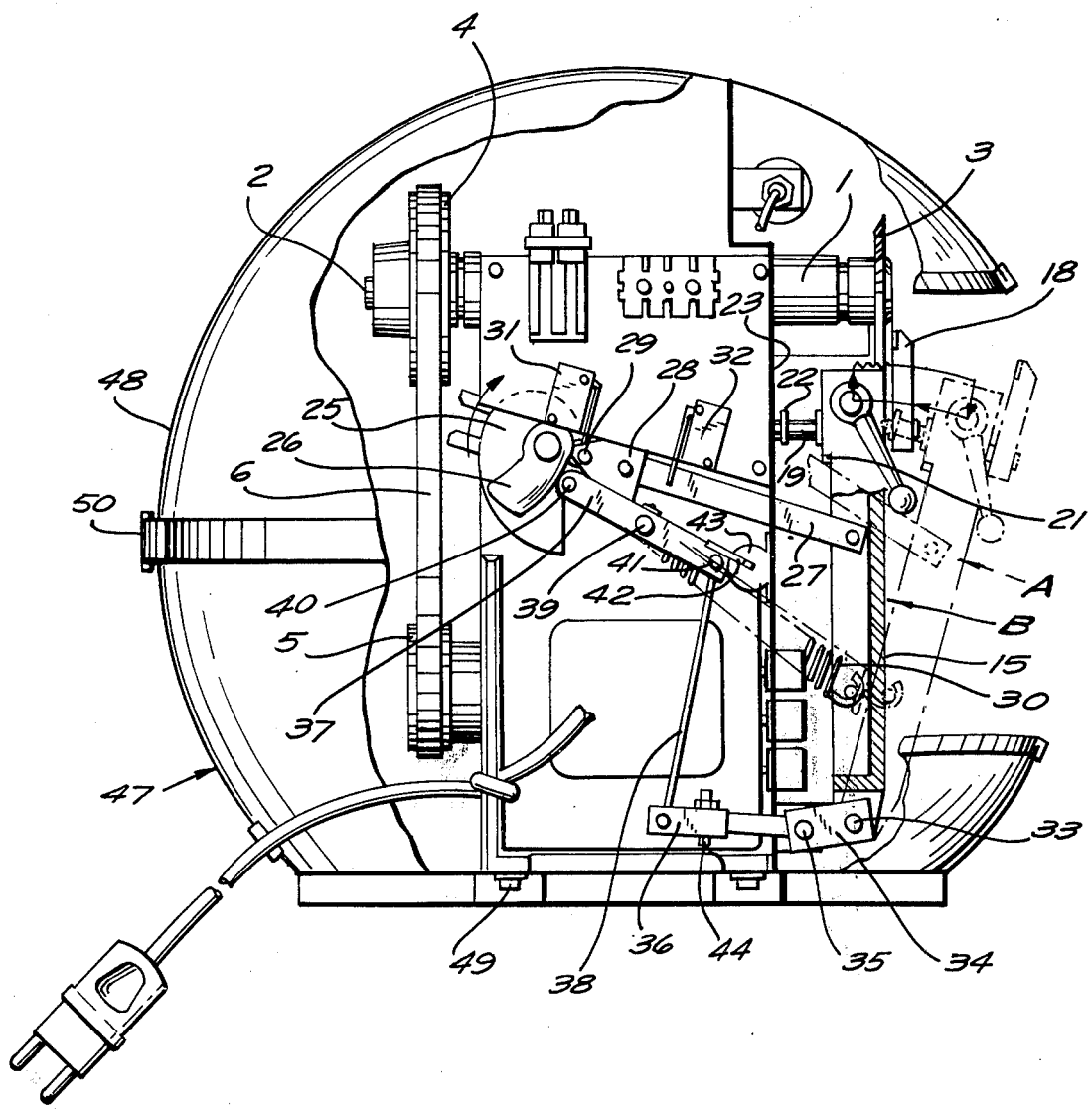
FIG. 2 is a longitudinal cross-section of the same machine, seen from the left.
Figure 3:
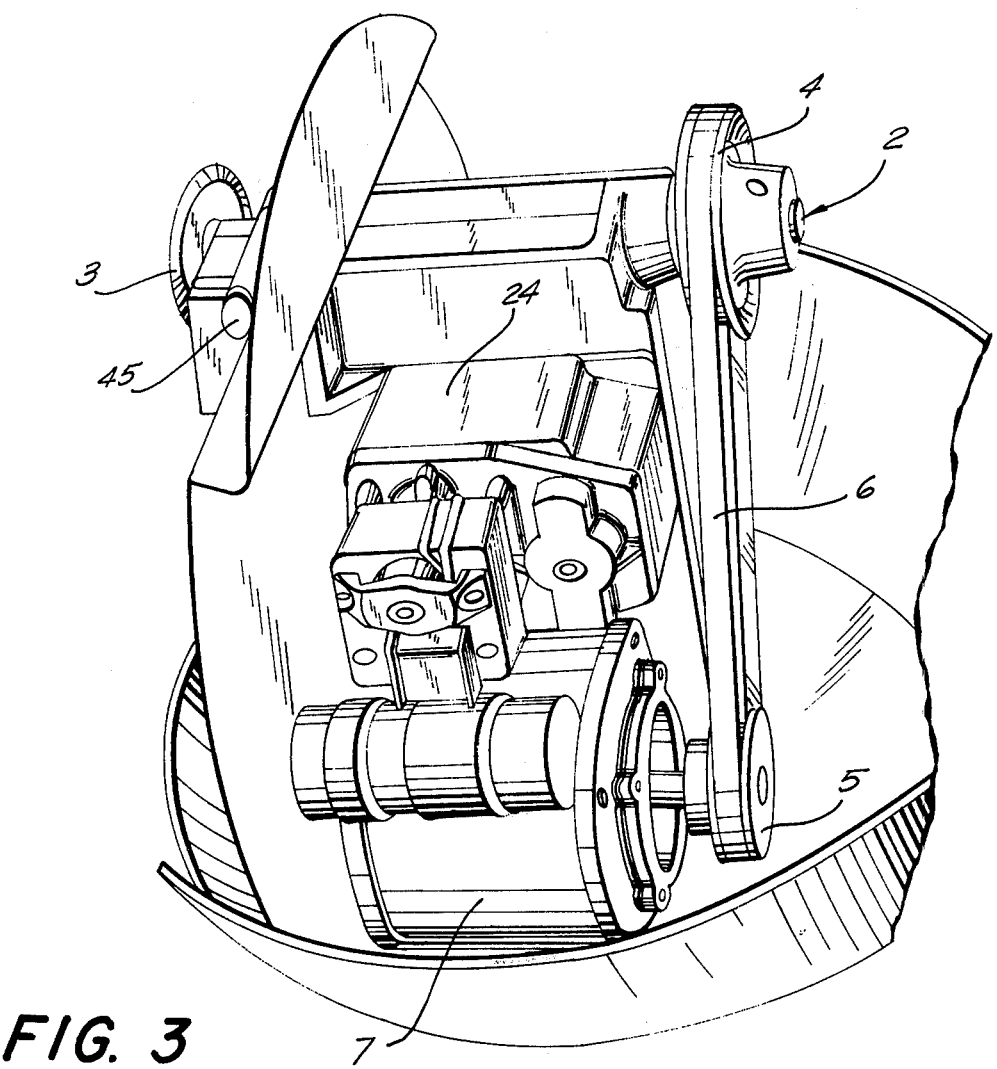
FIG. 3 is a perspective view of the whole mechanism of the machine, as seen from the rear-side.
Figure 6:
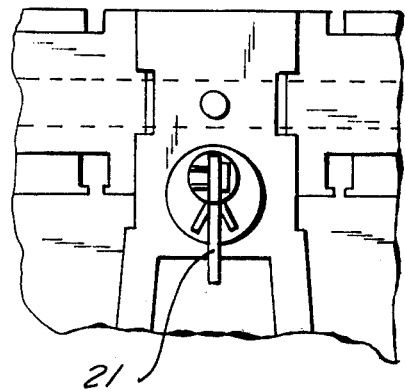
FIGS. 4 to 6 show details of the key-holding jaws and of the key centering device a front view, in a side view, and an enlarged fragmentary front view, respectively; an element being omitted in FIG. 6.
Figure 4:
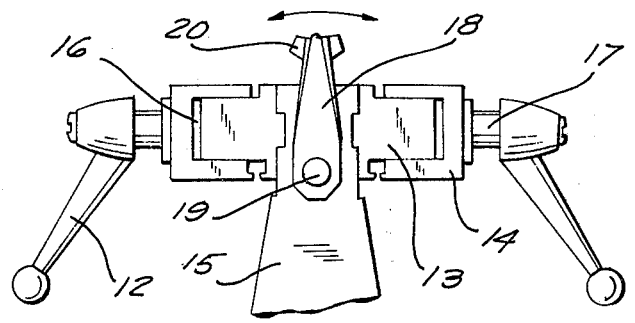
Figure 5:
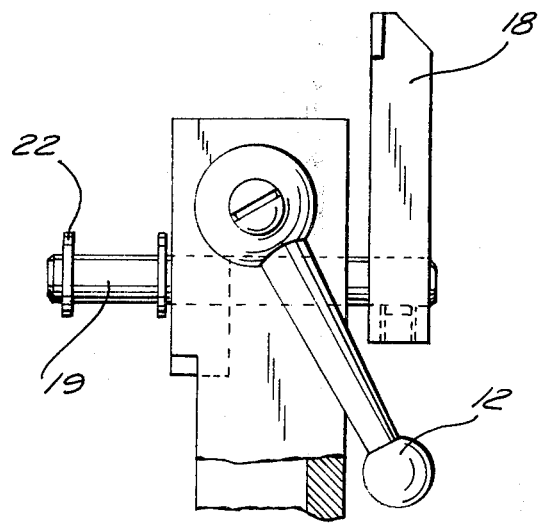

In accordance with the invention, the machine comprises, assembled on a rigid frame 1, and as more particularly apparent in FIGS. 1 to 3, a shaft 2 carrying a cutter 3 rotated by pulleys 4 and 5 connected to each other by a trapezoidal drive belt 6 and driven by the motor 7.

Figure 7:
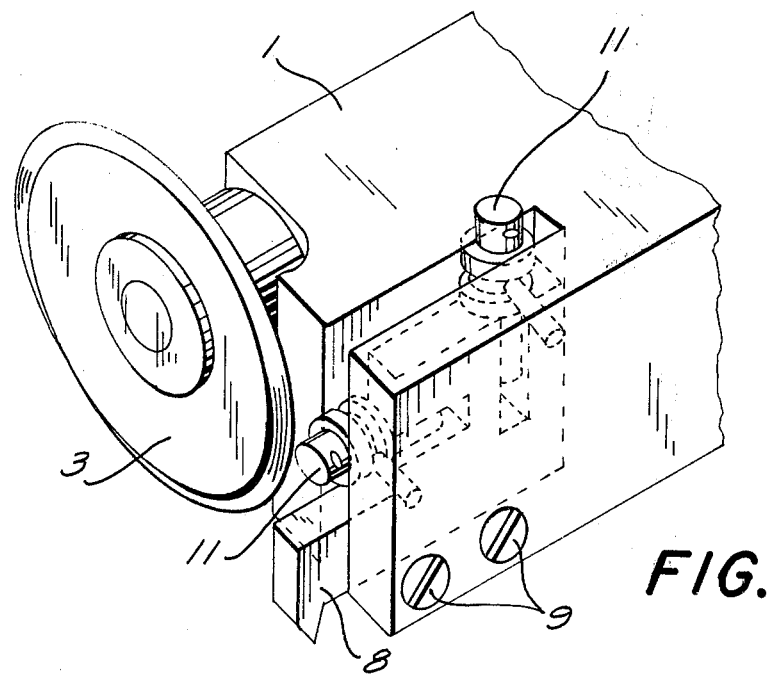
FIG. 7 is a detailed perspective view showing the arrangement and adjusting mechanism of the feeler.

In a slot of the frame 1 is also fixed, as represented in FIG. 7, a feeler 8 fixed by means of screws 9 with interposition of resilient washers that will prevent the feeler from escaping when the screws 9 are loosened in order to correct its position. The positioning of the feeler 8 in both vertical and horizontal directions is made while the same is guided between the side faces of the slot of the frame, and with the intermediary of two rods 11 pivoted in the frame and carrying eccentric-wheels lodged in two slits provided in the feeler at right angles to each other. These two eccentric-wheels are actuatable by means of radial fingers fixed on the rods 11 that support them and tightened by means of screws and springs. The horizontal rod 11 permits to move the feeler vertically, thus adjusting the depth of the cut, which should be corrected with regard to the variation in diameter of the cutter 3 after each sharpening operation which the use of said cutter necessitates. The vertical rod 11, on the other hand, permits to move the feeler parallel to the axis of the cutter in order to correct any possible defect in the alignment of the cutter 3 and the feeler 8 in relation to the key-holding jaws of the movable support described hereafter.

At the upper end of the above mentioned movable support 15, and symmetrically in relation to the median plane of this support, are arranged the sets of jaws which are used to secure the model key and the key blank to be milled. These two identical sets of jaws consist each of two members 13 and 14 centered on each other. Their tightening is obtained by means of a rotating handle 12. The member 13 of each of these sets of jaws is centered on the support in such a way as to permit the rotation through 180 degrees of the jaws, in order to selectively present slots of different shapes corresponding to the profiles of different keys when these are to be secured in the jaws. Between the two members 13 and 14 of the jaws are inserted compression springs 16 which tend to spread these members apart from each other when the tightening handles 12 are loosened. A rod 17 threaded at both of its ends and fixed in the central portion of the movable support 15 provides for the centering of the members 13 and 14 and for their tightening by the handles 12.

A key-centering device 18 is arranged at the central portion of the movable support 15. This consists of a lever pivotally mounted on a pin 19 and provided at its free end with two small wings 20 disposed symmetrically on each side of the median plane of the centering device in such a way that one of the small wings 20 comes into contact with the end abutment of the key on the side to be cut when the centering lever is swung from one side to the other. This assures a correct relative positioning of the keys in their respective jaws. A stack of elastic blades 21 integral with the pin 19 returns the centering lever 18 toward its central position after the keys are adjusted relatively to each other. A compression spring 22, mounted on the rear end of the pin 19, compensates for the play between the support side of the centering device 18 and the movable support 15. The pin 19 extends backwards sufficiently to cause the self-retraction of the centering device from its initial position, in which it provides for a relative positioning of the keys, to a position permitting the cutter 3 to move freely when the jaws are at their extreme position under the cutter so that the cutter cannot damage the centering device 18 during the milling operation. This retraction of the centering device 18 begins when, in the course of the cycle to be described below the end of the pin 19 comes into contact with the plate 23 of the frame of the machine.

According to an important characteristic of the preferred embodiment, best shown in FIG. 2, the movable support 15 is hinged at its lower end 33 to the end of a link 34 which itself pivots on a shaft 35 fixed to the frame of the machine and the other end of which comprises a member 36 connected by a rigid rod 38 to one end of a crank 37 pivotally mounted on a pin 39 integral with the frame and connected at its other end to a follower roller 40 which is urged in engagement with one of the cams to be described below. The movable support, on the other hand, is connected at its mid-height to a rod 27 of which the other end carries by means of a flange 28 a roller 29 urged into engagement with the other of the two control cams to be described below. Between the movable support 15 and the fixed pin 39 is also interposed a traction spring 30 which pulls the movable support 15 in an oblique direction towards the back and towards the upper part of the machine. The movable support can thus, first of all, pivot about the horizontal shaft 33, and secondly, move in a vertical direction within the limits allowed by the mounting of this support on the link 34.

The auxiliary motor reducer unit 24 carries on its shaft two cams 25 and 26 which are integral with each other. The cam 25 controls the oscillating movement of the movable support 15 about the horizontal shaft 33 by means of the roller 29 carried by the rod 27 the other end of which is connected to the movable support at the mid-height thereof; the guidance of the rod 27 during its movements is assumed by a two-pronged fork which extends from the rod backwards and which engages the shaft which carries the cams 25 and 26. The roller is kept in engagement with the cam 25 by one of the component forces developed by the return spring 30. The profile of the cam 25 is such as to provide for a relatively slow travel of the upper end of the movable support 15 towards the right in FIG. 2. This travel corresponds to the milling operation of the key blank during which the cam acts positively against the force developed by the return spring 30. On the other hand, the cam profile provides for a faster travel in the opposite direction, corresponding to the approach movement of the jaws 13, 14 to the departure position; this travel is controlled by a release of the spring 30 after the roller 29 passes the most out of-center point of the cam 25. The flange 28 is fixed to the end of the rod 27 by means of a screwed assemblage which allows the length to be adjusted when assembling the machine. The shaft of the roller 29 extends past one of the sides of the flange sufficiently to act as a control finger for two end-of-stroke electrical switches 31 and 32. It should be noted that, because of the appreciable height of the movable support 15, the pivoting movement imposed on the key-holding jaws is made compatible with the necessity of a precise duplication of the keys. To this end, the swing angle of the movable support 15 about the shaft 33, corresponding to the actual cutting stroke of the key must be less than the angle formed by the hollows of the teeth of the key diminued by the angle at the top of the cutter 3. The angles at the top are identical for the cutter 3 and the feeler 8. The link 34, pivotally connected as it has been described to the shaft 35 fixed to the frame and the pivoting shaft 33 of the movable support 15, allows for a limited vertical movement of the whole of the movable support 15 under the action of the vertical component of the force developed by the spring 30. The effect of this force is to urge positively the key blank against the cutter 3 at the same time as the model key is urged against the feeler 8.

The cam 26, also keyed to the shaft of the motor reducer unit 24, controls positively, by means of the crank 37, the rod 38, and the link 34, the lowering of the movable support 15 against the vertical component of the effort developed by the spring 30. The profile of this cam is such that it causes a fast displacement of the movable support 15 in the vertical direction in both directions. Further, the relative positioning of the two cams 25 and 26 is determined in such a way that the two kinds of motion given to the movable support 15 are coordinated in the way now to be described. The movements of the work cycle of the machine in accordance with the invention will be explained with reference to the FIG. 2 where, for the sake of clarity, the path of one point of the key has been traced with arrow-headed lines. In the rest position A, of support 15 illustrated by light lines on the drawing, the movable support 15 and therefore the key-holding jaws are at the greatest distance from the cutter and the feeler so as to make it quite easy placing of the keys in the jaws, or their removal after the milling operation. In a first step of the cycle, the movable support 15 is rapidly brought from position A to position B, illustrated in heavy lines, which is permitted by the relase of the spring 30 controlled by the control cam 25; this is done in such a way that the movable support 15 stays out of reach of the cutter 3 and of the feeler 8, due to the unit being kept in low position as a result of the action of the control cam 26 through the transmission 37, 38 and 34. From the position B, the movable support 15, and therefore also the key-holding jaws, rise slowly under the force of the spring 30 to engage with the feeler 8 and the cutter 3; the engagement of the key blank to be duplicated with the cutter 3 marks the start of the proper milling operation. This is effected afterwards, according to the path imposed by the profile of the model key to duplicate which itself follows the feeler 8, and also under the positive action developed at this time by the control cam 25 on the movable support 15 through the rod 27. The profile of the control cam 25 is designed so as to impose only one slow travel movement on the movable support 15 and the key-holding jaws in order to allow for a correct milling of the blank. Once this milling is finished, the movable support 15 and the key-holding jaws unit continues its pivotal movement toward the stop position, falling into its low position at the same time. The finished key can then be removed from the jaws and a new blank placed therein.

In order to permit a good performance of the mechanism it is recommended to leave some degree of freedom in at least one of the connections of the rigid rod 38. This rod can thus transmit the falling movement actuated by the cam 26 while permitting a limited freedom of movement of the movable support 15 in a vertical direction during the milling operation. The pin 41, joining the upper end of the rod 38 and the crank 37, can be advantageously extended on one side so as to actuate the lever 42 of a counter 43 used to indicate the number of keys milled on the machine. An adjusting screw 44 is provided on the member 36 in order to limit the vertical play by abutting the frame at the base thereof; this is done in order to avoid damaging the key-holding jaws by engagement with the cutter in case the machine is started without a model key having been placed in the corresponding jaws, thereby limiting the vertical play of the movable support 15 under the feeler 8.

Figure 9:
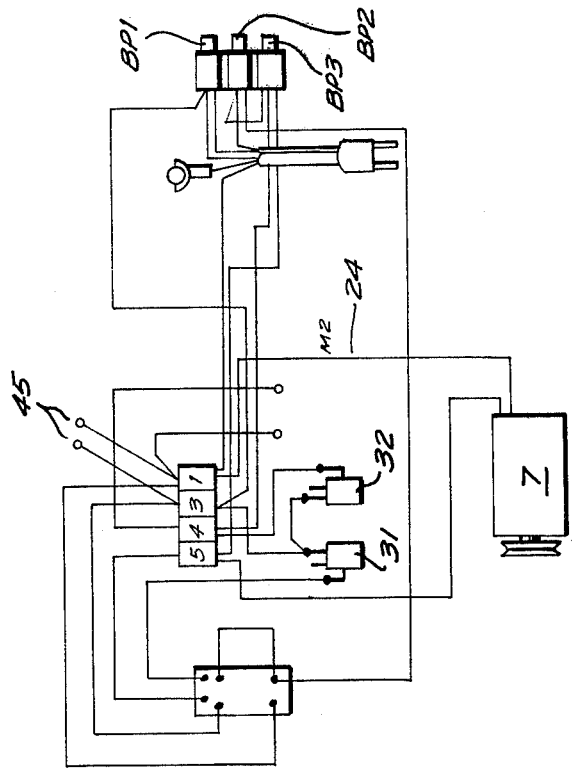
FIG. 9 shows the electrical wiring diagram thereof.
Figure 8:
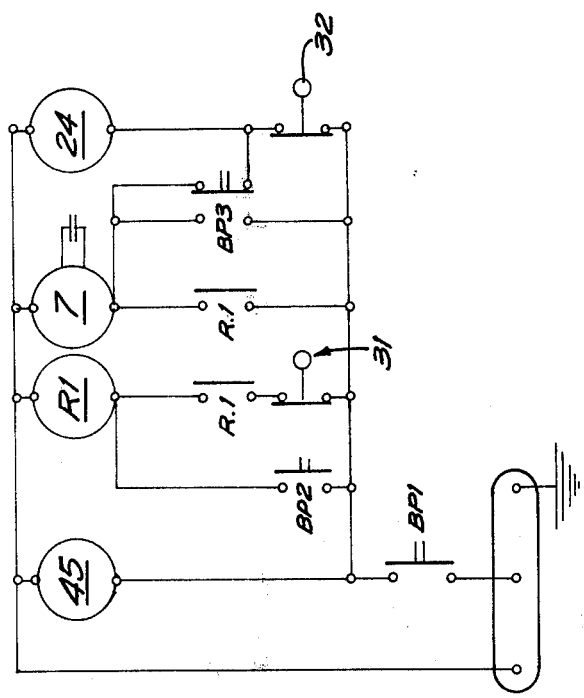
FIG. 8 shows the general electrical diagram of the machine.

FIGS. 8 and 9 of the drawings illustrate the electrical control circuits of the machine according to the invention in the form of a general electrical diagram and an electrical wiring diagram respectively. The whole of operation cycles is controlled by a unit having three push-button switches $BP_1$, $BP_2$, $BP_3$. The button $BP_1$, which serves as the main switch, controls a light 45. After placing the keys in the respective jaws, the button $BP_2$ permits to energize the coil relay $R_1$ which is kept closed afterwards by a self-feeding contact. A second relay contact of $BP_1$ supplies current to the main motor 7 at the same time as it feeds the motor reducer 24. At the time when the shaft of the roller 29 engages the end-of-stroke switch 31, the relay $R_1$ is deenergized and the contacts of the relay open, but the motors 7 and 24 continue to be fed through the end-of-stroke switch 32, that is, until the shaft of the roller 2 engages this switch 32 also. The push button $BP_3$ controls only the main motor 7 so that the wire brush 46 mounted on the end of the motor shaft can be used to deburr the milled key.

The whole of the machine is covered with a housing consisting of two hemispheres opened in the front. The frame 1, holding the mechanism, is fixed to the bottom 47 of the housing by means of screws 49. The upper part 48 of the housing is bonded to the part 47 by a belt 50, the section of which is designed to enclose the creased edges of the two parts 47 and 48. The both ends of the belt 50 are fixed by means of flanges 51 to the sides of the front opening of the two parts of the housing. This arrangement provides for easy access to the machine simply by loosening the flanges.

What we claim is:

1. A machine for automatically duplicating flat keys, comprising:
    a. a fixed frame, a movable support having a top portion and being hinged to said frame for movement about a horizontal axis, two sets of jaw means mounted in parallel relationship on said top portion of said movable support for clamping respectively, a model key and a key blank, a feeler carried by said frame engageable by said model key, a motor, a cutter operable by said motor and disposed on said frame having an axis which lies in the median longitudinal plane of the key blank for engagement of the blank by the cutter, two control cam means jointly rotatable for moving said movable support from a departure position to an end position, in respective coordinated reciprocating movements namely a first movement in a direction at least approximately parallel to the axis of said cutter with rapid travel of said support towards said departure position while said model key and said key blank are respectively below said feeler and below said cutter, and with slow travel in the opposite direction during a milling operation, and a second movement in a direction perpendicular to said cutter axis to bring said model key against said feeler and said key blank against said cutter during the milling operation;

b. parallelogram-like linkage means movable by said control cam means to perform said coordinated movements of said movable support about said horizontal axis and for guiding said movable support in said coordinated movements, comprising a link and a longitudinally extensible rod unit, said link and rod unit being pivotally mounted respectively, about relatively spaced axes on said frame to cause said movable support by rotation of said link in one direction to move perpendicularly to the axis of said cutter in a disengaging direction, and by longitudinal extension of said rod unit, to move parallel to the axis of said cutter in the direction corresponding to its slow travel; and c. spring return means for resiliently biasing said movable support against both of said two control cam means while they move said linkage means to move said movable support in said slow travel of the first movement and said rapid travel of the second movement, said spring return means being arranged obliquely to the directions of said first and second movements and being interposed between said frame and said movable support for biasing said support towards said departure position.

2. A machine according to claim 1, including a base portion which is part of said movable support and is pivotally connected to said link; a crank rotatably connected to said frame; a rod connecting said crank to said link; and follower roller means on the crank engageable with one of said control cam means for permitting said movable support to be moved toward the axis of said cutter for the milling of the key blank by said spring return means, and to be moved oppositely relative to the axis of said cutter by said one cam means.

3. A machine according to claim 2 including stop means on said fixed frame or cooperating with said linkage means to limit one of said movements of said movable support.

4. A machine according to claim 1 including means for adjusting positions of said feeler, comprising, means defining a recess in said fixed frame in which said feeler is adjustable horizontally and vertically; means defining two slots recessed into said feeler at right angles to each other; two rods each individually pivotally mounted on said frame; two eccentric fingers one supported by each rod; each of said fingers projecting into one of said slots; and means associated with each rod for turning a corresponding one of said eccentric fingers to correspondingly shift said feeler in said recess.

5. A machine according to claim 1, including positioning means for adjusting the model keu and the key blank in their respective jaws, comprising lever means pivotally mounted about a horizontal axis extending in a plane of symmetry of said movable support and having a free end; wing means at two sides of said free end for alternately engaging ends of the key and key blank when the lever means swings alternately to one side and then to the other; and spring means for biasing said lever means to a central position between said sides.

6. A machine according to claim 1, wherein the two sets of jaws have movable parts and are mounted symmetrically to each other on two sides of said movable support, the machine including a rod extending transversally of said movable support and threaded at opposite ends for engaging said movable parts of said jaws, said movable parts having actuating handles, said jaws being pivotable by at least 180° about the axis of said rod.

* * * * *